G. A. CLARKE.
HARVESTER.

No 14,043. Patented Jan. 1, 1856.

UNITED STATES PATENT OFFICE.

G. A. CLARKE, OF PHILADELPHIA, PA., ASSIGNOR TO WM. CLARKE.

IMPROVEMENT IN HARVESTER RAKING APPARATUS.

Specification forming part of Letters Patent No. 14,043, dated January 1, 1856.

*To all whom it may concern:*

Be it known that I, GEORGE A. CLARKE, of Philadelphia, in the county of Philadelphia and State of Pennsylvania, have invented a new and useful Improvement in Harvesters; and I do hereby declare that the following is a full, clear, and exact description of the same, reference being had to annexed drawings, making a part of this specification, in which—

Figure 1:
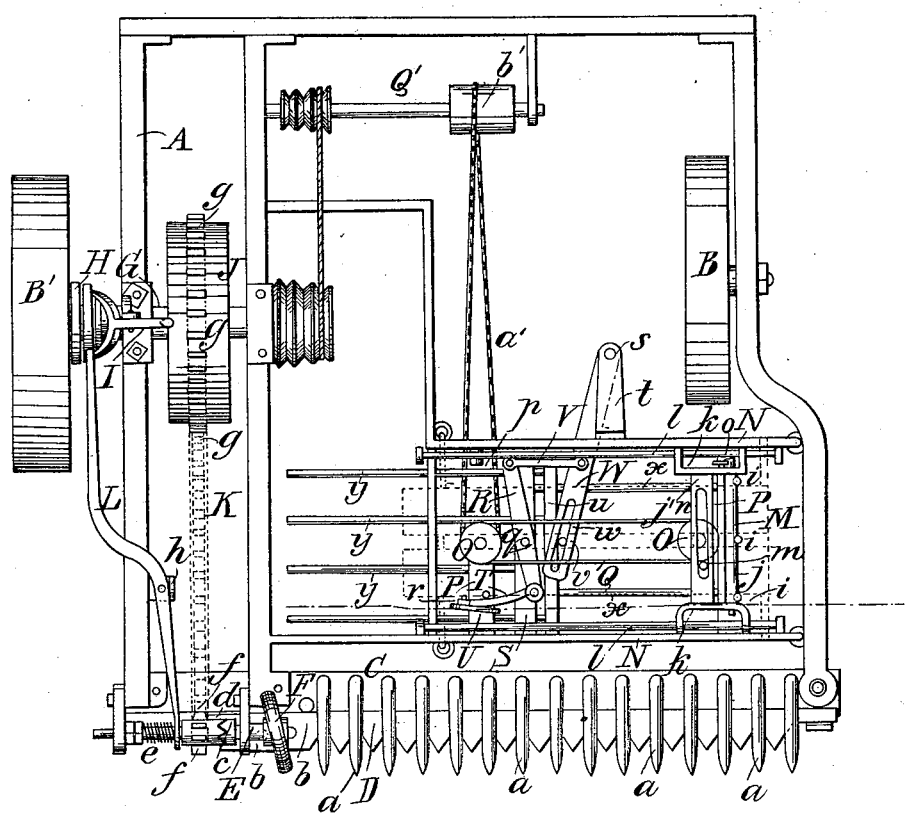
Figure 2:
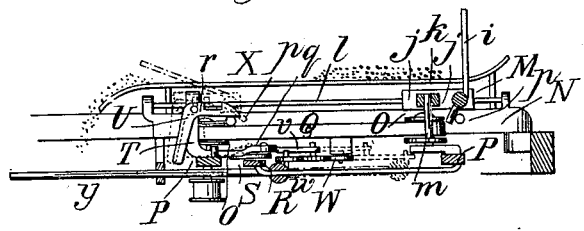

Figure 1 is a plan or top view of my improvement. Fig. 2 is a detached front view of the raking attachment.

Similar letters of reference indicate corresponding parts in the two figures.

The nature of my invention consists in a raking attachment constructed, arranged, and operating as will be hereinafter fully shown.

To enable others skilled in the art to fully understand and construct my invention, I will proceed to describe it.

A represents the frame of the machine, which is of rectangular form and supported by two wheels, B B'. (See Fig. 1.)

To the front end of the frame A the finger-bar C is attached, having the usual fingers, $a$, secured to it, in which fingers the sickle D works, the sickle being also of usual construction.

To the front end of the frame A, and in line with the sickle D at one end of it, there is placed a small shaft, E, which has a wheel, F, hung upon it obliquely. (See Fig. 1.) The edge or periphery of this wheel works between two small uprights, $b\ b$, on the end of the sickle D. The shaft E has a hub or boss, $c$, permanently attached to it, which hub or boss is toothed or serrated on its outer edge, and on the shaft E there is placed loosely a collar, $d$, having its inner edge toothed or serrated. The teeth of the collar $d$ are kept in gear with the teeth of the hub or boss $c$ by means of a spiral spring, $e$, which is placed around the shaft E. The collar $d$ has teeth or projections $f$ on its periphery.

G is a shaft attached to one side of the frame A, and on the outer end of which the wheel B' is placed loosely. This wheel is attached to the shaft G, when desired, by a clutch, H, of usual construction, said clutch being operated by a lever, I.

J is a pulley attached permanently to the shaft G, and having teeth $g$ on its periphery, and K is a chain, which passes around the pulley J and around the collar $d$ on the shaft E, the teeth on the pulley and collar fitting in the links of the chain. (See dotted lines, Fig. 1.)

L is a lever, which has its fulcrum at $h$. The outer end of this lever is forked and fits over the shaft E between the inner end of the spiral spring $e$ and collar $d$. The outer end of the lever L extends a short distance beyond the lever I.

M is a rake, which is formed of teeth $i$, attached to a rod, $j$, the ends of which are fitted loosely in slides $k\ k$, which work freely on guide-rods $l\ l$, attached to bars N N, placed in the frame A parallel with the finger-bar C.

O O are two pulleys, which are attached to bars P P at the under side of the bars N N. The pulleys O O are placed at a requisite distance apart, and have an endless belt, Q, passing around them, to which belt an upright pin, $m$, is attached, said pin fitting in a slot, $n$, in a rod, $j'$, attached to the slides $k\ k$ of the rake M. One end of the rod $j$ has a pin or rod, $o$, passing transversely through it, which pin strikes against projections $p$ on one of the bars N at the end of each stroke or vibration of the rake, as will be presently shown. The endless belt Q is driven by a belt, $a'$, which passes around the lower part of one of the pulleys O and around a pulley, $b'$, on a shaft, Q', which receives its motion from the shaft G.

R is a lever, which is attached by a pivot, $q$, to a bar, S, underneath the bars N N. One end of this lever R is attached by an arm, T, to a catch, U, by a pivot, $r$. The opposite end of the lever R has an arm, V, attached to it, which arm is connected to a lever, W. The outer end of the lever W is attached by a pivot, $s$, to a projection, $t$, on one of the bars N. The inner end of the lever W has a slot, $u$, made through it, in which a pin, $v$, attached to a rod, $w$, fits. The rod $w$ slides on rods $x\ x$, attached to the bars P S, and has rods $y\ y\ y$ attached to it.

X is a platform, which is fitted over the raking attachment, the platform having grooves cut in it to allow the rake-teeth $i$ to work through.

Operation: As the machine is drawn along a reciprocating motion is given the sickle D by means of the oblique wheel F, which is rotated by means of the chain K, the collar $d$ turns the shaft E in consequence of its teeth being kept in gear with the teeth of the hub or boss *c* by the spiral spring *e*, and if the sickle becomes clogged the wheel F and hub or boss *c* will remain stationary, the collar *d* slipping around and compressing the spring *e*, and also moving the lever L and operating the clutch H, so as to throw the driving-wheel B′ out of gear with the shaft G. The driving apparatus is thereby rendered self-operating, and the sickle, in case of being choked, will be thrown out of gear at the proper time, and will be prevented from injury or breakage. As the grain is cut by the sickle it falls over on the platform X, and the rake M is moved back and forth by the endless belt Q, which is operated by the belt *a'*. When the rake M reaches the end of its backward stroke the teeth are elevated in consequence of the pin *o* striking against the projection *p*, and the rake in moving toward the driving end of the sickle carries the grain off the platform. Just before the rake M reaches the end of the platform the rod *j'* catches against the end of the arm T and moves it outward, and consequently throws the rods *y* backward, so that the grain will fall upon the ground, and as the rake returns the rod *j'* will draw upon the catch U and force outward the rods *y* to their original position, so that the rods will catch the grain that is cut opposite to them and retain it till the rake again arrives at the end of the platform X.

The above invention is simple and effective and operates practically well.

Having thus described my invention, what I claim as new, and desire to secure by Letters Patent, is—

Operating the rake M by means of the endless belt Q, in combination with the levers R W, connected with the rods *y*, as shown, for the purpose of raking the cut grain from the platform X.

GEORGE A. CLARKE.

Witnesses:
JOSEPH SHAW,
WILLIAM CLARKE.